United States Patent [19]

Radlove

[11] 4,137,336
[45] Jan. 30, 1979

[54] DIETETIC COOKIE MIX

[76] Inventor: Sol B. Radlove, 1165 Pleasant Run Dr., Wheeling, Ill. 60090

[21] Appl. No.: 818,616

[22] Filed: Jul. 25, 1977

[51] Int. Cl.² ............................................. A21D 10/00
[52] U.S. Cl. .................................... 426/555; 426/658; 426/653
[58] Field of Search ............... 426/554, 555, 658, 656, 426/653

[56] References Cited

U.S. PATENT DOCUMENTS

| | | | |
|---|---|---|---|
| 2,874,053 | 2/1959 | Mills | 426/554 X |
| 3,161,524 | 12/1964 | Opie et al. | 426/554 |
| 3,170,795 | 2/1965 | Andre | 426/551 |
| 3,227,559 | 1/1966 | Radlove | 426/611 |
| 3,658,553 | 4/1972 | Radlove | 426/554 X |
| 3,694,230 | 9/1972 | Cooke | 426/554 |

OTHER PUBLICATIONS

"Now You Can Have Better Flavor, Higher Yield, and Lower Production Costs . . . from a Single Ingredient," Amoco Foods Co., Chicago, Ill. 60601.
Doty et al, *Food Technology*, Nov. 1975, pp. 35-38.
Doty, *Cereal Foods World*, vol. 21, No. 2, Feb., 1976, pp. 62-63.

*Primary Examiner*—Jeanette M. Hunter
*Attorney, Agent, or Firm*—Gerald A. Mathews

[57] ABSTRACT

A dry, dietetic cookie mix which need only to be combined with water and baked to produce a batch of cookies. The mix is free of artificial sweeteners, egg yolks and ordinary sugar. Fructose provides natural sweetness and combines with a unique blend of other ingredients, including torula yeast, an emulsifier, stearyl monoglyceridyl citrate to produce a cookie having good texture, crispness, flavor, mouth-feel and sweetness.

12 Claims, No Drawings

_4,137,336_

DIETETIC COOKIE MIX

BACKGROUND OF THE INVENTION

This invention relates to a dry, flour based dietetic cookie mix that utilizes fructose as a natural sweetener. It is free of ordinary sugar, egg yolks and artificial sweeteners.

Dietetic and, especially, diabetic baked dessert foods, such as cookies, chronically suffer from poor taste, most notably from insufficient sweetness. The term "dietetic foods" means those foods prepared and formulated especially for those persons on special diets, such as, for example, low cholesterol and sugar free diets.

Sweeteners, including ordinary sugar (sucrose), saccharin, cyclamates, and sorbitol, and their combinations, all have some sort of undesirable attributes, especially from a diabetic standpoint, including after-taste, objectionable taste, side effects and potential harm to human health. For example, for some people saccharin has an unpleasant bitter metallic after-taste and has recently been suspected as a carcinogen. Sorbitol has only about one half the sweetness of sucrose, but when consumed in fairly large quantities can cause some people to suffer gastric discomfort and diarrhea. Sucrose must be used in such large amounts in order to impart the desired degree of sweetness that the product contains too many calories to make it suitable for consumption by persons on a diet. Further, sucrose is quickly metabolized, requiring insulin, which makes it generally unsuitable for diabetic use.

It has not to my knowledge been heretofore possible to provide an acceptable degree of sweetness in a dietetic cookie without using non-nutritive artificial sweeteners, such as saccharin and cyclamates. My U.S. Pat. No. 3,658,553 describes the use of a combination of sorbitol (a nutritive sweetener) and saccharin in a dietary dry cake mix.

In recent years, some nutritionists and the U.S. Food and Drug Administration have from time to time expressed concern about the use of sorbitol, saccharin and cyclamates as food sweeteners, either alone or in combination with nutritive sweeteners. Such concern by the FDA has resulted in cyclamates being banned, although there has been considerable debate over the medical basis for this action. The major concern expressed about saccharin and cyclamates is whether they are detrimental to human health if consumed in large quantities over a long time.

In contrast to saccharin and cyclamates, fructose is a naturally occurring nutritive sweetener. It is a carbohydrate and has the same amount of calories per unit weight as another natural sugar, sucrose. Accordingly, it is believed to be as safe for human consumption as any natural food. Fructose tastes like ordinary common sugar, but is approximately 50 percent sweeter than sucrose and 150% sweeter than sorbitol. In fact, fructose is the sweetest natural sugar known. This relatively high level of sweetness allows less fructose to be required in many products with a corresponding reduction in sugar derived calories of about 20–80 percent. However, this is not true in products subjected to heat as fructose rearranges into a less sweet form when heated. Fructose varies in sweetness depending on temperature, time, acidity and use. In heated products, fructose is generally in a less sweet form and in unheated products, it is in a sweeter form.

Compared to common sugar, fructose enters the blood stream at a relatively slow rate. In addition fructose absorption, unlike that of either glucose or galactose, does not stimulate either glucagon from the gut or insulin from the pancreas. These and related properties are believed to enable fructose to be utilized in the body metabolism without having an adverse effect on glucose metabolism by which blood sugar is assimulated and metabolized into the body utilizing insulin. For these and other reasons which are not fully understood, studies have shown that fructose can be used in moderate amounts in the diet of persons having mild or well balanced diabetes without deleterious effects.

The relatively slow rate that fructose is absorbed and metabolized in the liver enhances the desirability of its use by the persons on a special diet since glucose is thereby released into the blood stream more evenly over an extended period of time to naturally control hunger.

Finally, because fructose is sweeter than common sugar, in some applications it can be used in smaller, more moderate, quantities in diets to provide the desired degree of sweetness with a corresponding reduction in the amount of sugar derived calories.

SUMMARY OF THE INVENTION

As desirable as the sweetening and dietetic properties of fructose are, its use as a substitute for sugar in cookies has not heretofore been at all successful. The reason is that fructose loses much of its sweetness when the cookie batter is heated. When used as the sweetener in ordinary cookie batter, the batter tastes sweet, but the baked cookie tastes flat and unsweet.

The fact that fructose loses sweetness upon being heated may well explain why it has heretofore met with virtually no success in baked products. Indeed, its primary use has been in unheated foods, especially desserts, as exemplified by U.S. Pat. No. 3,236,658 entitled "Fructose Containing Frozen Dessert."

In an attempt to determine why fructose loses sweetness as it is heated, some researchers have shown that this relative sweetness of fructose is related to the degree of mutarotation from the sweeter $\beta$-D-fructopyranose form of the crystalline substance to the less sweet $\beta$-D-fructofuranose and $\alpha$-D-fructofuranose forms. The term "mutarotation" refers to a change in chemical structure, under the influence of heat, to obtain a different isomer. Also, with increasing temperature and acidity, the ratio of pyranose to ferranose anomers, and, thus, the relative sweetness, decreases. In other words, as the temperature increases and the acidity increases, fructose decreases in sweetening power. These findings were reported by Theodore E. Doty in Cereal Foods World, Feb. 1976, Vol. 21, No. 1.

While researchers may be able to explain how fructose loses its sweetness upon being heated, nobody has until now determined how fructose can be made to retain its sweetness, or otherwise be compensated for, in baked cookies. I have discovered a unique blend of ingredients which, when combined with fructose in a cookie mix, produce a cookie that is acceptably sweet and has good texture, crispness, and mouthfeel as well. It is believed this it the only cookie mix that does not contain egg yolks.

The unique blend of ingredients includes torula yeast and stearyl monoglyceridyl citrate (SMGC). Another important ingredient is propylene glycol monostearate (PGMS).

It is not known exactly how, from a food chemistry standpoint, these ingredients, or one or more of them, enable the fructose to retain a sufficient degree of its sweetness while it is heated during the cookie baking process. It is known that the resultant cookie has an undeniably acceptably sweet taste. The residual sweetness in the baked cookie may be a synergistic effect not directly attributable to the ordinary property of any one of my unique combination of ingredients.

Contrary to the teachings of researchers, such as the article in Cereal Foods by Mr. Doty, the blend of ingredients in my cookie mix produces a fructose sweetened baked cookie that is sweet. The fructose has retained its sweetness through the baking process.

It is believed that the ability of the fructose to retain its sweetness through the heat of baking is a result of a synergistic property of the unique blend of ingredients. Specifically, it is thought that the torula yeast exhibits a heretofore unknown property in that either by itself, or in combination with one, some or all of the other ingredients, including fructose, it either enhances the natural sweetness of fructose or retards the degradation of fructose into less sweet components during the baking process, or both.

The baked cookie is not only sweet, but it possesses excellent texture, taste and mouth-feel, both of which are especially important to the impression of overall quality, goodness and "normalcy" desired by consumers.

Such "normalcy" in taste, texture and mouth-feel is often sadly lacking in dietetic products, particularly in baked dietetic products. Indeed, crumbly texture and mealey mouth-feel, together with insufficient sweetness, are commonly considered to be hallmarks of prior dietetic cookies.

Additionally, since the mix is free of egg yolks and whole milk, it is very low in cholesterol so that the cookie is especially suited for coronary care patients and others requiring a low cholesterol diet.

Accordingly, it is an object of this invention to provide a dry, dietetic cookie mix that utilizes fructose as the sweetener and which produces a baked cookie that is acceptably sweet.

Another object of this invention is to provide a dry, dietetic cookie mix that is free of egg yolks and artificial sweeteners.

Another object of this invention is to provide a dry, dietetic cookie mix that utilizes torula yeast and fructose to provide sweetness in the baked cookie.

Still another object of this invention is to provide a dry, dietetic cookie mix that produces a cookie having good taste, texture, and mouth-feel.

Another object of the invention is to provide a dry, dietetic cookie mix that utilizes torula yeast in a ratio by weight to the non-shortening portion (excluding torula yeast of from about 0.5% to about 2.5%.

Yet another object of this invention is to provide a dry, dietetic cookie mix that utilizes stearyl monoglyceridyl citrate in a ratio by weight to the shortening portion (excluding SMGC) of from about 0.75% to about 10%.

A further object is to provide a cookie mix that includes torula yeast, SMGC and fructose, and which produces a baked cookie that is acceptably sweet with good taste, texture and mouth-feel.

A feature of this invention is the use of propylene glycol monostearate as the emulsifier.

Other objects, features and advantages of this invention will become readily apparent to those skilled in the art upon learning of the preferred embodiment described below.

DESCRIPTION OF THE PREFERRED EMBODIMENTS

For the purpose of best understanding this invention in conjunction with the examples to be presented later, the dry mix can be divided into non-shortening, shortening and baking powder portions. In addition, part of the non-shortening portion (torula yeast) and an emulsifier enhancer (stearyl monoglyceridyl citrate, or SMGC), that is perhaps best included in the shortening portion, are broken out separately in order to illustrate the importance of their presence and properties in the mix with regard to the overall quality of the baked cookie.

The baking powder portion consists of an alkaline bicarbonate component (bicarbonate of soda) and an acid which reacts with the bicarbonate in the presence of water to liberate carbon dioxide gas. This gas is dispersed throughout the batter to give the baked cookie its characteristic texture and mouth-feel. The preferred alkaline bicarbonate is potassium bicarbonate, and the preferred acidic component is sodium aluminum phosphate which is available under the trade name Pan-O-Lite.

The shortening portion comprises a blend of primary emulsifiers, an emulsifier enhancer and vegetable fat or oil. The preferred shortening component used in this cookie mix is a liquid vegetable oil and is selected for its stability since it is desired to prevent oxidation and subsequent rancidification while the mix is on the retailer's shelf. Hydrogenated vegetable oils are high in saturated fats. The higher the saturated (i.e., hydrogenated) fat level, the more stable the product. Conversely, the lower the saturated fat level, the less stable the product. Our preferred liquid vegetable oil is primarily monounsaturated, but contains some saturated, and a small portion of polyunsaturated, fatty acids.

The dry mix is formed when the non-shortening, baking powder and shortening portions are combined and blended to produce a mixture suitable for packaging. Adding water to the dry mixture and blending produces a batter ready for baking.

When water is added to the dry mix, the emulsifiers act to combine the oil (fat) in the shortening with the water so that they can be mixed with the other ingredients to form a homogeneous mixture.

The balance between the various flavors, tastes and effects of food ingredients, and the way they enhance, suppress and modify each other to create different tastes, flavors and effects is very complex and delicate and somewhat mysterious. So much so that the food chemistry involved to produce a desired result is often thought to be the result of the culinary "art," or even a serendipity, as much as a plan.

The unexpected sweetness of the cookie produced from this mix is thought to be the result of a new combination and proportion of ingredients. Specifically, torula yeast heretofore has been considered a flavor enhancer, an egg substitute, a protein supplement and an emulsifier to bind fats and water. For reasons not quite understood, I have discovered that torula yeast (such as Torutein 94 manufactured by Amoco Foods Company) functions in the presence of one or more other ingredients to provide the heretofore unknown effect of permitting fructose to retain its sweetness during the baking process so that the baked cookie is acceptably sweet. Its use also permits the cookie mix to use about half the amount of egg whites that normally would be required.

The acidic component of the baking powder I prefer is sodium aluminum phosphate (such as Pan-O-Lite manufactured by Monsanto Co.) which is very stable.

The primary emulsifier that I prefer is propylene glycol monostearate (PGMS) and the preferred shortening is a liquid shortening (such as Durkex 500 manufactured by Durkee Foods). The shortening is also selected for its long shelf life since the cookie mix in boxes is often on retail shelves for months before being sold.

Stearyl monoglyceridyl citrate (SMGC) is used as an emulsifier enhancer. It also seems to function to enhance the combination of torula yeast and fructose to impart or retain sweetness in the baked cookie. Also, it appears to control the evaporation rate of the water in the cookie as it is baked so that the cookie comes out dry and with an attractive brown color. SMGC is described in more detail in my U.S. Pat. No. 3,227,559.

What follows is the results of tests, including the best mode contemplated, conducted to illustrate the effects of various combinations, and proportions, of ingredients. In each example, the non-shortening, shortening and baking powder portions are the same except that the portions of the torula yeast and SMGC are varied. Also in each example, the mixing instructions are the same as follows:

To 6¼ ounces of the dry mix, add 3 tablespoons of water and mix for one minute at a low speed, such as #1 on a Sunbeam Mixmaster. Make small, thin drop cookies on a greased cookie sheet and bake in a preheated oven for about 7.5 minutes at 350° F. Remove the pan. When cool, remove the cookies.

| Butter-Flavored Dietetic Cookie Mix Non-Shortening Portion | | |
|---|---|---|
| Ingredients | Ounces | Grams |
| Flour | 4.0 | 113.36 |
| Fructose | 3.0 | 85.02 |
| Skim Milk Solids | 0.4 | 11.34 |
| Egg Whites (dried) | 0.4 | 11.34 |
| Vanillin (16 fold) | 0.0212 | 0.6 |
| Salt | 0.0935 | 2.65 |
| Ethyl Veltol | 0.0007 | .02 |
| Vanilla on Whey | 0.0353 | 1.0 |
| Hi Score Butter Flavor | 0.0176 | 0.5 |
|  | 7.9683 | 225.83 |

| Shortening Portion | | |
|---|---|---|
| Ingredient | Ounces | Grams |
| Liquid Shortening (Durkex 500) | 1.05 | 30.0 |
| Propylene Glycol Monostearate | 0.035 | 1.0 |
|  | 1.085 | 31.0 |

| Baking Powder Portion | | |
|---|---|---|
| Ingredient | Ounces | Grams |
| Potassium Bicarbonate | 0.035 | 1.0 |
| Sodium Aluminum Phosphate (Pan-O-Lite) | 0.035 | 1.0 |
|  | 0.070 | 2.0 |

EXAMPLE 1

To the indicated Non-Shortening (N) or Shortening (S) Portions of the dry mix, the following ingredients were added in the amounts shown:

| Ingredient | Portion | Ounces | Grams |
|---|---|---|---|
| Torula Yeast (Torutein 94) | (N) | None | — |
| Stearyl Monoglyceridyl Citrate | (S) | None | — |

Comments
Baking time: 7 minutes at 350° F.
Color: dark brown
Sweetness: none - flat tasting
Overall quality: very poor, unacceptable

EXAMPLE 2

To the indicated Non-Shortening (N) or Shortening (S) Portions of the dry mix, the following ingredients were added in the amounts shown:

| Ingredient | Portion | Ounces | Grams |
|---|---|---|---|
| Torula Yeast (Torutein 94) | (N) | 0.19 | 5.38 |
| Stearyl Monoglyceridyl Citrate | (s) | None | — |

Comments
Baking time: 7 minutes at 350° F.
Color: dark brown
Sweetness: slightly sweet
Overall quality: not acceptable

EXAMPLE 3

To the indicated Non-Shortening (N) or Shortening (S) Portions of the dry mix, the following ingredients were added in the amounts shown:

| Ingredient | Portion | Ounces | Grams |
|---|---|---|---|
| Torula Yeast (Torutein 94) | (N) | 0.19 | 5.38 |
| Stearyl Monoglyceridyl Citrate | (S) | 0.035 | 1.0 |

Comments
Baking time: 7.25 minutes at 350° F.
Color: uniform medium brown
Sweetness: good, acceptable
Overall quality: good, excellent taste and acceptable sweetness

EXAMPLE 4

To the indicated Non-Shortening (N) or Shortening (S) Portions of the dry mix, the following ingredients were added in the amounts shown:

| Ingredient | Portion | Ounces | Grams |
|---|---|---|---|
| Torula Yeast (Torutein 94) | (N) | 0.2 | 5.67 |
| Stearyl Monoglyceridyl Citrate | (S) | 0.035 | 1.0 |

Comments
Baking time: 7.5 minutes at 350° F.
Color: uniformly medium brown tops and bottoms
Sweetness: acceptable
Overall quality: excellent taste and mouth-feel; relatively crisp.

EXAMPLE 5

To the indicated Non-Shortening (N) or Shortening (S) Portions of the dry mix, the following ingredients were added in the amounts shown:

| Ingredient | Portion | Ounces | Grams |
|---|---|---|---|
| Torula Yeast (Torutein 94) | (N) | 0.2 | 5.67 |
| Stearyl Monoglyceridyl Citrate | (S) | 0.1059 | 3.0 |

Comments
Baking time: 7.5 minutes at 350° F.
Color: uniformly brown
Sweetness: acceptable
Overall quality: fairly crisp with excellent taste

EXAMPLE 6

To the indicated Non-Shortening (N) or Shortening (S) Portions of the dry mix, the following ingredients were added in the amounts shown:

| Ingredient | Portion | Ounces | Grams |
| --- | --- | --- | --- |
| Torula Yeast (Torutein 94) | (N) | 0.1 | 2.83 |
| Stearyl Monoglyceridyl Citrate | (S) | 0.1059 | 3.0 |

Comments
Baking time: 7.5 minutes at 350° F.
Color: uniformly brown
Sweetness: acceptable
Overall quality: fairly crisp with excellent taste

EXAMPLE 7

To the indicated Non-Shortening (N) or Shortening (S) Portions of the dry mix, the following ingredients were added in the amounts shown:

| Ingredient | Portion | Ounces | Grams |
| --- | --- | --- | --- |
| Torula Yeast (Torutein 94) | (N) | 0.05 | 1.417 |
| Stearyl Monoglyceridyl Citrate | (S) | 0.1059 | 3.0 |

Comments
Baking time: 7.5 minutes at 350° F.
Color: uniformly brown
Sweetness: acceptable
Overall quality: fairly crisp with excellent taste

EXAMPLE 8

To the indicated Non-Shortening (N) or Shortening (S) Portions of the dry mix, the following ingredients were added in the amounts shown:

| Ingredient | Portion | Ounces | Grams |
| --- | --- | --- | --- |
| Torula Yeast (Torutein 94) | (N) | 0.2 | 5.668 |
| Stearyl Monoglyceridyl Citrate | (S) | 0.0088 | 0.25 |

Comments
Baking time: 7.5 minutes at 350° F.
Color: uniformly brown
Sweetness: acceptable
Overall quality: crisp, good taste; excellent mouth-feel

EXAMPLE 9

To the indicated Non-Shortening (N) or Shortening (S) Portions of the dry mix, the following ingredients were added in the amounts shown:

| Ingredient | Portion | Ounces | Grams |
| --- | --- | --- | --- |
| Torula Yeast (Torutein 94) | (N) | None | — |
| Stearyl Monoglyceridyl Citrate | (S) | 0.1059 | 3.0 |

Comments
Baking time: 7.5 minutes at 350° F.
Color: uniformly brown
Sweetness: sweetness barely detectable
Overall quality: crisp, good taste

EXAMPLE 10

To the indicated Non-Shortening (N) or Shortening (S) Portions of the dry mix, the following ingredients were added in the amounts shown:

| Ingredient | Portion | Ounces | Grams |
| --- | --- | --- | --- |
| Torula Yeast (Torutein 94) | (N) | 0.2 | 5.668 |
| Stearyl Monoglyceridyl Citrate | (S) | 0.1059 | 3.0 |

Comments
Baking time: 7.5 minutes at 350° F.
Color: uniformly brown
Sweetness: acceptable
Overall quality: crisp, good taste, acceptable A review of the examples reveals several interesting and unexpected results. Examples 1, 2 and 3 are identical except for the presence of torula (examples 2 and 3) and SMGC (example 3). The absence of both these ingredients (example 1) yields a flat tasting, unsweet, unacceptable cookie. Fructose alone does not impart sweetness to the baked cookie. The presence of 0.19 oz. of torula yeast only (example 2) yields a slightly sweet cookie (i.e. the sweetness has moved over the threshhold to achieve the minimally acceptable level) that still has unacceptable quality and taste compared to the cookie in example 3. When both of these ingredients are present in moderate amounts (1.0 gm. SMGC and 5.38 gm torula yeast in example 3), the baked cookie has excellent taste and acceptable sweetness.

It appears that torula yeast, in the form here of Torutein 94 (TM) manufactured by Amoco Foods Company, imparts sweetness, or causes, or combines with, other ingredients to impart or retain sweetness to the baked cookie. This is surprising since this property, or effect, has not heretofore believed to have been known. Prior uses of torula yeast have been to enhance flavors, supply protein, bind fats to water and substitute for eggs, among others.

At this time, it should be pointed out that I am distinguishing between flavor and taste. Thus, I use the word "flavor" to identify a particular item or source such as cherry, vanilla or chocolate. The word "taste" is used to refer to those basic senses possessed by the tongue, such as sweetness, saltiness and sourness. These senses are not identified with, or obtained from, any one item, such as candy, pickles or anchovies. Other things taste sweet, sour and salty, but only cherries have cherry flavor and only chocolate has chocolate flavor.

Examples 4 through 8 illustrate a range of properties of torula yeast and SMGC to their respective non-shortening and shortening portions. Throughout these ranges, the sweetness of the baked cookie is acceptable and the cookie has excellent taste and mouth-feel. The SMGC ranges from between 0.25 gm to 3.0 gm while the related amount of torula yeast ranges from 1.417 gm up to 5.67 gm.

Examples 9 and 10 should be reviewed in connection with example 8 to illustrate once again that the overall sweetness of the baked cookie depends on the presence of torula yeast with different amounts of SMGC, but in both cases, the baked cookie has acceptable sweetness, good taste and mouth-feel. In example 9, which contains no torula yeast, the sweetness is barely acceptable even though there is as much SMGC in the cookie as in any other example.

Other observations can be made concerning the relative proportion of the torula yeast to the non-shortening portion of the mix by weight. The non-shortening portion, excluding the Torutein - 94, weighs 225.83 gm. The torula yeast ranges from 1.417 gm (example 7) to 5.67 gm. Thus, its proportion of the non-shortening portion by weight is from about 0.5% to about 2.5%.

The shortening portion weighs 31 gm, excluding the SMGC. Thus the proportion of the SMGC to the shortening portion by weight is from about 0.75% (example 8) to about 10%.

As important as torula yeast is to the resultant sweetness in the baked cookie, it is also clear from the examples that SMGC plays an important role. While not capable of imparting sweetness to the cookie (compare examples 1 and 2), it appears to combine with the torula yeast and fructose to enhance or retain sweetness and to produce an acceptably sweet cookie (compare examples 1, 2 and 3). Further, the SMGC produces a cookie having good texture, mouth-feel and flavor; without SMGC, the cookie is slightly sweet, but lacks these other essential properties.

In the non-shortening portion, some of the ingredients are commonly found in cookie mixes. These are flour, skim milk solids, dried egg whites and salt. Vanillin is an artificial flavoring and vanilla and butter are flavorings. Ethyl veltol is a flavor enhancer.

These examples pertain to a butter flavored cookie mix, but, obviously, other flavorings can be substituted without departing from the spirit and scope of the invention. In the same spirit, some variations in the more common ingredients, such as flour, salt, egg whites and skim milk solids, and their proportions, and other modifications may be made without departing from the spirit and scope of the invention. For example, the fructose in these examples was provided in pure crystalline form. However, the fructose can be provided in a liquid form, such as a high fructose corn syrup. Thus, the sweetness is provided essentially by fructose, especially in the sense that the baked cookie retains its diabetic and dietetic use, characteristics and qualities. Therefore, I contemplate that the appended claims cover any such variations and modifications as may fall within the true spirit and scope of my invention.

What is claimed is:
1. In a dietetic, dry cookie mix, free of artificial sweeteners, having
   (1) a non-shortening portion comprising flour, a sweetener, skim milk solids and dried egg whites;
   (2) A shortening portion comprising shortening;
   (3) a baking powder portion comprising an acidic component and an alkaline bicarbonate component;
the improvement wherein:
   the sweetener is provided essentially by fructose;
   the non-shortening portion includes torula yeast in a sufficient amount so that a cookie baked from batter formed when the dry mix is combined with water and mixed has acceptable sweetness.
2. The cookie mix as set forth in claim 1, wherein: the mix is free of egg yolks.
3. The cookie mix as set forth in claim 1, wherein: the torula yeast comprises from about 0.5% to about 2.5% of the non-shortening portion by weight.
4. The cookie mix as set forth in claim 1, wherein: the fructose comprises less than about forty percent of the non-shortening portion, including torula yeast, by weight.
5. The cookie mix as set forth in claim 1, wherein: the stearyl monoglyceridyl citrate comprises from about 0.75% to about 10% of the shortening portion by weight.
6. The cookie mix as set forth in claim 1, wherein: the shortening portion includes vegetable shortening.
7. The cookie mix as set forth in claim 1, wherein: the ratio of the torula yeast to the fructose, by weight, ranges from about 1.5% to about 7%.
8. The cookie mix as set forth in claim 1, further including:
   stearyl monoglyceridyl citrate in a ratio to the fructose, by weight, which ranges from about 0.25% to about 4.0%.
9. A dietetic, dry cookie mix having non-shortening, shortening and baking powder portions, and being free of egg yolks and artificial sweeteners, wherein:
   the non-shortening portion comprises flour, a sweetener, skim milk solids, egg whites and includes torula yeast in a ratio by weight with the other non-shortening portion ingredients of from about 0.5% to about 2.5%;
   the baking powder portion comprises an acid component and an alkaline bicarbonate component;
   the sweetener is provided essentially by fructose which comprises less than about 40% of the non-shortening portion by weight;
   the shortening portion comprises vegetable shortening and includes stearyl monoglyceridyl citrate in a ratio by weight to the other shortening portion ingredients of from about 0.75% to about 10%; and
   the cookie baked from batter formed when the dry mix is combined with water and mixed has acceptable sweetness, good taste, texture and mouth-feel.
10. The cookie mix as set forth in claim 9, wherein: the shortening portion includes a liquid vegetable oil.
11. The cookie mix as set forth in claim 9, wherein: the shortening portion includes propylene glycol monostearate.
12. A dietetic, dry cookie mix, free of egg yolks and artificial sweeteners, having non-shortening, shortening and baking powder portions, wherein:
   the non-shortening portion comprises flour, skim milk solids, dried egg whites, salt, fructose and torula yeast;
   the shortening portion comprises vegetable shortening, an emulsifier and stearyl monoglyceridyl citrate;
   the baking powder portion comprises an acidic component and an alkaline bicarbonate component;
   the ratio by weight of the fructose, torula, yeast and stearyl monoglyceridyl citrate components is about 85.0:6.0:0.25 to about 85.0:1.2:3.0; and
   the cookie formed when the dry mix is combined with water, mixed and baked has acceptable sweetness, good taste, texture and mouth-feel.

* * * * *